(12) United States Patent
Hegdal et al.

(10) Patent No.: US 9,810,366 B2
(45) Date of Patent: *Nov. 7, 2017

(54) HIGH TEMPERATURE FIELD JOINTS

(71) Applicant: ShawCor Ltd., Toronto (CA)

(72) Inventors: Jan Peder Hegdal, Fannrem (NO);
Torgeir Sletvold, Orkanger (NO);
Eileen Wan, Richmond Hill (CA);
Suresh Choudhary, Houston, TX (US)

(73) Assignee: SHAWCOR LTD., Toronto (CA)

( * ) Notice: Subject to any disclaimer, the term of this patent is extended or adjusted under 35 U.S.C. 154(b) by 362 days.

This patent is subject to a terminal disclaimer.

(21) Appl. No.: 14/455,213

(22) Filed: Aug. 8, 2014

(65) Prior Publication Data

US 2015/0041017 A1 Feb. 12, 2015

Related U.S. Application Data

(60) Provisional application No. 61/863,976, filed on Aug. 9, 2013, provisional application No. 62/021,751, filed on Jul. 8, 2014.

(51) Int. Cl.
*F16L 9/14* (2006.01)
*F16L 59/02* (2006.01)
(Continued)

(52) U.S. Cl.
CPC ............ *F16L 59/029* (2013.01); *B23K 31/02* (2013.01); *B23K 31/027* (2013.01); *B23K 37/00* (2013.01);
(Continued)

(58) Field of Classification Search
CPC .............................. F16L 59/029; B23K 31/027
(Continued)

(56) References Cited

U.S. PATENT DOCUMENTS 3,422,855 A * 1/1969 Weyer .................... F01N 13/16
138/141
3,508,946 A * 4/1970 Plueddemann .......... B05D 1/24
138/145
(Continued)

FOREIGN PATENT DOCUMENTS

CA 2835008 11/2012
EP 2573443 3/2013
(Continued)

OTHER PUBLICATIONS

International Search Report and Written Opinion for PCT/CA2014/050750.
(Continued)

*Primary Examiner* — Vishal Pancholi
(74) *Attorney, Agent, or Firm* — DeLio, Peterson & Curcio, LLC; Thomas E. Ciesco

(57) ABSTRACT

A method for forming a high temperature field joint between two insulated pipe sections, and an insulated conduit having a low temperature field joint. The conduit comprises a steel pipe with a corrosion protection coating and a pipe insulation layer comprising a polymer composition having thermal conductivity of less than about 0.40 W/mk, and/or heat resistance to continuous operating temperatures from about 150° C. to above about 205° C. After a circumferential weld joint is formed between the two pipes, a first field joint insulation layer is applied over the joint area, the first field joint insulation layer comprises a polymer composition having heat resistance to continuous operating temperatures from about 150° C. to above about 205° C.

43 Claims, 5 Drawing Sheets

(51) Int. Cl.
  *B23K 31/02* (2006.01)
  *B23K 37/00* (2006.01)
  *F16L 58/10* (2006.01)
  *F16L 59/14* (2006.01)
  *F16L 58/18* (2006.01)
  *F16L 59/20* (2006.01)
  *F16L 13/02* (2006.01)
  *B29C 39/10* (2006.01)
  *B29C 33/00* (2006.01)
  *F16L 1/16* (2006.01)
  *F16L 9/02* (2006.01)
  *F16L 9/22* (2006.01)

(52) U.S. Cl.
  CPC .......... *B29C 33/0011* (2013.01); *B29C 39/10* (2013.01); *F16L 1/161* (2013.01); *F16L 9/02* (2013.01); *F16L 9/22* (2013.01); *F16L 13/0272* (2013.01); *F16L 58/1054* (2013.01); *F16L 58/1081* (2013.01); *F16L 58/181* (2013.01); *F16L 59/14* (2013.01); *F16L 59/143* (2013.01); *F16L 59/20* (2013.01)

(58) Field of Classification Search
  USPC ................................ 138/145, 149, 155, 146
  See application file for complete search history.

(56) References Cited

U.S. PATENT DOCUMENTS

| | | | |
|---|---|---|---|
| 3,685,546 A * | 8/1972 | Sigmund | F16L 59/04 138/112 |
| 3,992,237 A * | 11/1976 | Gerholt | F16L 59/028 138/149 |
| 4,019,761 A * | 4/1977 | Heidemann | F16L 59/20 285/288.11 |
| 4,148,982 A | 4/1979 | Morozumi et al. | |
| 4,341,842 A * | 7/1982 | Lampe | C09D 183/04 138/145 |
| 4,415,184 A * | 11/1983 | Stephenson | E21B 17/00 138/149 |
| 4,530,970 A | 7/1985 | Morozumi et al. | |
| 4,606,953 A * | 8/1986 | Suzuki | B05D 7/148 138/143 |
| 4,660,861 A * | 4/1987 | Argy | F16L 59/029 138/149 |
| 4,746,147 A * | 5/1988 | Walker | F16L 59/182 285/374 |
| 4,748,208 A | 5/1988 | Kasahara et al. | |
| 5,143,122 A | 9/1992 | Adkins | |
| 5,571,585 A | 11/1996 | Yoshida et al. | |
| 5,721,285 A | 2/1998 | Nakamoto et al. | |
| 6,068,026 A * | 5/2000 | Garois | B32B 1/08 138/126 |
| 6,264,871 B1 | 7/2001 | Mullen et al. | |
| 6,576,311 B2 * | 6/2003 | Noguchi | B32B 25/14 138/137 |
| 7,493,918 B2 | 2/2009 | Thomson | |
| 7,588,058 B2 | 9/2009 | McKeen et al. | |
| 8,127,800 B2 | 3/2012 | Ramaswamy et al. | |
| 8,176,943 B2 | 5/2012 | Stroempl et al. | |
| 8,397,765 B2 | 3/2013 | Jackson et al. | |
| 2005/0165168 A1 | 7/2005 | Park | |
| 2005/0182157 A1 | 8/2005 | Truckai | |
| 2007/0259147 A1 | 11/2007 | Boudry et al. | |
| 2009/0159146 A1 | 6/2009 | Jackson et al. | |
| 2010/0043906 A1 | 2/2010 | Jackson et al. | |
| 2011/0165407 A1 | 7/2011 | Weidinger et al. | |
| 2011/0297316 A1 | 12/2011 | Jackson et al. | |
| 2012/0077935 A1 | 3/2012 | Gurevich et al. | |
| 2012/0202047 A1 | 8/2012 | Welch et al. | |
| 2012/0227851 A1 | 9/2012 | Stroempl et al. | |
| 2013/0042974 A1 | 2/2013 | Luther et al. | |
| 2013/0098798 A1 | 4/2013 | Hatton et al. | |
| 2013/0108800 A1 | 5/2013 | Chakraborty et al. | |
| 2013/0171367 A1 | 7/2013 | Kusinski et al. | |
| 2014/0311614 A1 | 10/2014 | Edmondson et al. | |

FOREIGN PATENT DOCUMENTS

| | | |
|---|---|---|
| GB | 2165910 A | 4/1986 |
| WO | WO 89/11618 | 11/1989 |
| WO | WO2006058270 | 6/2006 |
| WO | WO 2009/027686 A1 | 3/2009 |
| WO | 2009/086068 | 7/2009 |
| WO | WO2010009559 | 1/2010 |
| WO | WO 2013/070074 A1 | 5/2013 |
| WO | WO 2013/154432 | 10/2013 |
| WO | 20140028444 | 2/2014 |
| WO | WO2014131127 | 9/2014 |

OTHER PUBLICATIONS

AGC Chemicals Europe, Ltd. et al., AFLAS Fluoroelastomers—AFLAS Technical Brochure, Oct. 2007, pp. 1-20.
Aflaz Technical Brochure, AGC Chemicals, Asahi Glass Co., Ltd. (12 pages).

* cited by examiner

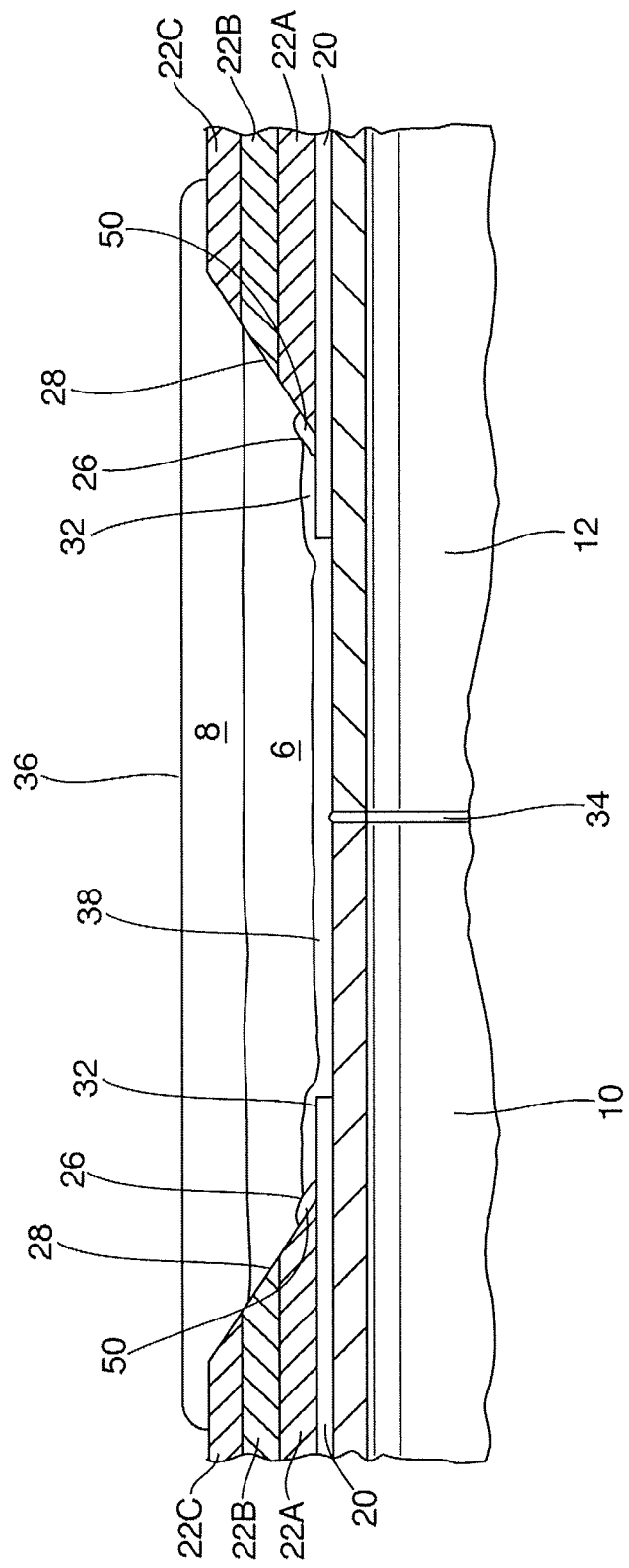

HIGH TEMPERATURE FIELD JOINTS

CROSS-REFERENCE TO RELATED APPLICATIONS

This application claims priority to and the benefit of U.S. Provisional Patent Application No. 61/863,976 filed Aug. 9, 2013; and U.S. Provisional Patent Application No. 62/021,751 filed Jul. 8, 2014.

FIELD OF THE INVENTION

This invention relates to corrosion protection, mechanical protection and insulation of welded joints between sections of coated pipe which are to be incorporated into an undersea pipeline for carrying single or multi-phase fluids such as oil, gas and water, particularly such pipelines operating at temperatures from about 150° C. to above about 205° C.

BACKGROUND OF THE INVENTION

Undersea pipelines may be formed from sections of steel pipe having factory-applied corrosion protection and insulating coatings. During the manufacture of insulated pipe, the ends of the pipe must be left bare to prevent damage to the coating when the pipes are joined in the field by welding. Typically, the insulation layer is cut back from the end of the pipe to form a chamfer which is spaced from the end of the pipe. A lip of the corrosion protection layer may protrude beyond the end (or "toe") of the chamfer. The chamfering step is typically performed in the factory as part of the manufacturing process.

The individual pipe sections are joined together in the field to form a continuous pipeline. The joints between the pipe sections are known as "field joints", and are formed by butt welding the pipe sections together, and then applying a layer of insulation over the bare pipe surrounding the weld joint. These steps may be performed as the pipeline is being reeled onto or from a lay vessel (so called "tie-in joints"), during pre-fabrication of multi-jointed pipe strings, or immediately before laying of the pipeline. For reasons of economy, field joints must be rapidly formed and cooled to an acceptable temperature so as not to slow down the reeling or laying operation.

Processes for applying field joints to pipelines are disclosed in commonly assigned U.S. patent application Ser. No. 12/794,402 by Jackson et al., which was published as US 2011/0297316 A1 on Dec. 8, 2011, and which is incorporated herein by reference in its entirety.

There is increasing demand in the oil and gas industry for higher performance coatings to insulate and protect offshore transport conduits operating at temperatures from about 150° C. to above 200° C. Examples of high temperature resistant pipeline coatings are disclosed in commonly assigned U.S. Provisional Patent Application No. 61/863,976 by Wan et al., filed on Aug. 9, 2013, and in U.S. patent application Ser. No. 14/193,663 by Edmondson et al., filed on Feb. 28, 2014, both of which are incorporated herein by reference in their entireties.

Conventional field joint materials such as epoxy corrosion protection coatings and polyolefin insulation layers may not be suitable for use in field joints for pipelines operating at temperatures from about 150° C. to above 200° C. Therefore, there remains a need for reliable field joint systems for use in high temperature fluid and/or gas transport conduits such as oil and gas pipelines, particularly those operating at these high temperatures.

SUMMARY OF THE INVENTION

In an embodiment, there is provided a method for forming a field joint between two insulated pipe sections. The method comprises: (a) providing a first insulated pipe section and a second insulated pipe section, wherein each of the insulated pipe sections comprises: (i) a steel pipe having an outer surface and an end, wherein an annular connection surface is located at said end of the steel pipe, (ii) a corrosion protection coating provided over the outer surface of the steel pipe, wherein a terminal end of the corrosion protection coating is spaced from the end of the pipe; and (iii) a pipe insulation layer provided over the corrosion protection coating, wherein a terminal end of the pipe insulation layer is spaced from the end of the pipe, and wherein the pipe insulation layer comprises a polymer composition having thermal conductivity of less than about 0.40 W/mk, and/or heat resistance to continuous operating temperatures from about 150° C. to above about 205° C. The corrosion protection coating and the pipe insulation layer together comprise a line pipe coating of the insulated pipe sections; and each of the insulated pipe sections has a bare end portion in which the outer surface of the steel pipe is exposed, the bare end portion extending from the end of the steel pipe to the terminal end of either the corrosion protection coating or the pipe insulation layer.

The method further comprises: (b) welding the steel pipe of the first insulated pipe section to the steel pipe of the second insulated pipe section, so as to form a circumferential weld joint between the annular connection surfaces of the steel pipes, and so as to form a continuous joint area which includes the circumferential weld joint and the bare end portions of the insulated pipe sections.

The method further comprises: (c) applying a first field joint insulation layer over the joint area, wherein the first field joint insulation layer comprises a polymer composition having heat resistance to continuous operating temperatures from about 150° C. to above about 205° C.

In another embodiment, there is provided an insulated conduit, comprising: (a) a first insulated pipe section and a second insulated pipe section as defined above, with a circumferential weld joint between the annular connection surfaces of the steel pipes, wherein a continuous joint area includes the circumferential weld joint and the bare end portions of the insulated pipe sections.

The insulated conduit further comprises: (b) a field joint comprising: (i) a first field joint insulation layer over the joint area, wherein the first field joint insulation layer comprises a polymer composition having heat resistance to continuous operating temperatures from about 150° C. to above about 205° C.

In yet another embodiment, the first field joint insulation layer comprises a silicone elastomer having heat resistance to continuous operating temperatures from about 150° C. to above about 205° C., and wherein the silicone elastomer comprises a room temperature vulcanizing (RTV) silicone elastomer selected from the group comprising single component and dual component silicone elastomers.

In yet another embodiment, the first field joint insulation layer is applied directly to the bare end portions of the insulated pipe sections in said joint area, and wherein the first field joint insulation layer is applied to a thickness which is substantially equal to a thickness of the line pipe coating.

In yet another embodiment, the method further comprises the step of applying a protective layer over the first field joint insulation layer, wherein the protective layer comprises an unfoamed polymeric material and overlaps the line pipe coating on both sides of the first field joint insulation layer.

In yet another embodiment, the method further comprises the step of applying an anti-corrosion coating to the joint area after the steel pipes are welded together, wherein the anti-corrosion coating comprises a silicone elastomer having heat resistance to continuous operating temperatures from about 150° C. to above about 205° C., and wherein the first field joint insulation layer comprises a room temperature vulcanizing (RTV) silicone elastomer selected from the group comprising single component and dual component silicone elastomers.

In yet another embodiment, the silicone elastomer of the anti-corrosion coating is a dual component RTV silicone elastomer; and the method further comprises applying heat to the anti-corrosion coating to cure the silicone elastomer.

In yet another embodiment, a lip of the corrosion protection layer protrudes beyond the terminal end of the pipe insulation layer of each of the insulated pipe sections, and wherein the anti-corrosion coating at least partially overlaps said lip.

In yet another embodiment, the method further comprises the step of applying a barrier layer over the terminal ends of the pipe insulation layers, wherein the barrier layer comprises a RTV silicone elastomer which is applied to the terminal ends of the pipe insulation layer before the anti-corrosion coating is applied.

In yet another embodiment, the barrier layer is at least partially cured by application of heat before the anti-corrosion coating is applied to the joint area.

In yet another embodiment, wherein the first field joint insulation layer comprises a fluoroelastomer composition, such as a crosslinked, thermoset fluoroelastomer composition.

In yet another embodiment, the fluoroelastomer composition is applied to the joint area in at least a partially uncured form, and the fluoroelastomer composition is cured by heating the pipe before and/or during application of the first field joint insulation layer, or wherein the fluoroelastomer composition is left in the uncured form.

In yet another embodiment, the first field joint insulation layer comprises hydrogenated nitrile butadiene rubber (HNBR), or a blend of HNBR and a crosslinked, thermoset fluoroelastomer composition.

In yet another embodiment, the method further comprises the step of applying a second field joint insulation layer over the first field joint insulation layer, wherein the second field joint insulation layer comprises a polymer composition having thermoplastic having heat resistance at continuous operating temperatures in a range from about 90° C. to above about 140° C.

In yet another embodiment, the second field joint insulation layer comprises an epoxy-modified polymer network.

In yet another embodiment, the epoxy-modified polymer network comprises a network epoxy modified urethane having heat resistance at continuous operating temperatures in a range from about 90° C. to about 100° C.

In yet another embodiment, the first and second field joint insulation layers have a combined thickness which is greater than that of the line pipe coating, and wherein the second field joint insulation layer overlaps the line pipe coating on both sides of the joint area.

In yet another embodiment, the pipe insulation layer comprises a layer of a fluoroelastomer composition.

In yet another embodiment, the pipe insulation layer further comprises a layer of an elastomeric composition different from the fluoroelastomer composition.

In yet another embodiment, a lip of the corrosion protection layer protrudes beyond the terminal end of the pipe insulation layer of each of the insulated pipe sections; wherein the first field joint insulation layer is applied directly to the bare end portions of the insulated pipe sections in said joint area; and wherein the first field joint insulation layer at least partially overlaps said lip.

In yet another embodiment, the lip includes an outer layer comprising thermal insulation of the same composition as an innermost layer of the pipe insulation layer.

In yet another embodiment, the first field joint insulation layer and the outer layer of the lip are each comprised of a fluoroelastomer.

In yet another embodiment, the method further comprises the step of applying an adhesive layer or performing a surface activating pretreatment to one or more layers of the field joint, so as to improve adhesion between said layers, wherein the surface activating pretreatment is selected from flame treatment, corona discharge treatment, and plasma treatment.

BRIEF DESCRIPTION OF THE DRAWINGS

The embodiments will now be described, by way of example only, with reference to the accompanying drawings in which:

FIGS. 3, 3A, 4 and 5 illustrate field joints according to specific embodiments of the invention.

DETAILED DESCRIPTION

A number of high temperature field joint systems and methods for forming high temperature field joints are now described below with reference to the drawings.

The methods described herein are performed in the field during the connection of insulated pipe sections to form a continuous pipeline. As mentioned above, these steps are typically performed as the pipeline is reeled onto a lay vessel, during pre-fabrication of multi-jointed pipe strings, or as the pipeline is unreeled from a lay vessel.

Figure 1:
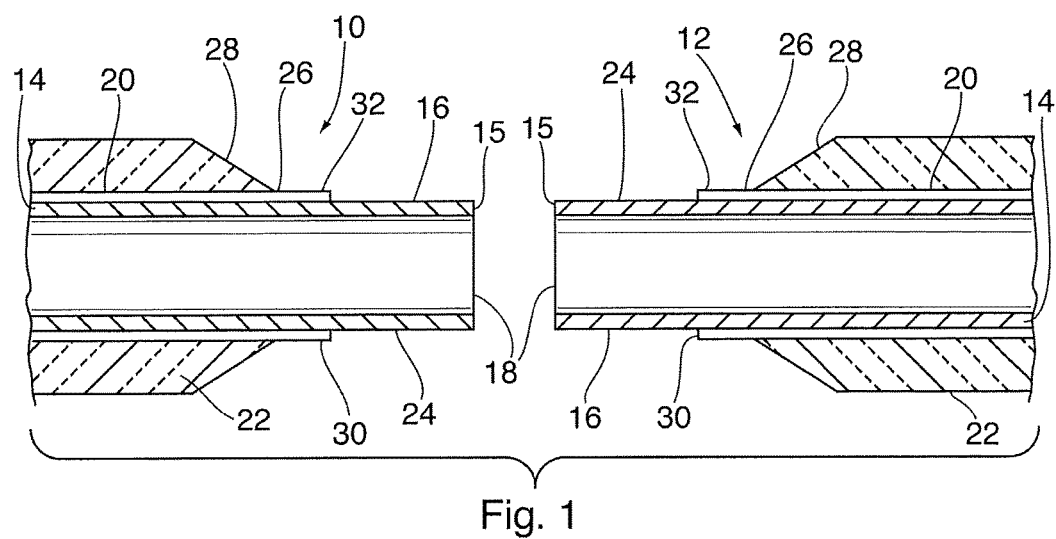
FIG. 1 is a cross-sectional view of a pair of insulated pipe segments prior to being joined by welding.

FIG. 1 illustrates the end portions of a first insulated pipe section 10 and a second insulated pipe section 12 to be joined and provided with a field joint. Each pipe section 10 or 12 may comprise a single length of pipe, as supplied from a factory, or a partially assembled pipeline comprising a plurality of pipe sections welded together end-to-end. The pipe sections 10 and 12 are of a typical construction, as would be obtained from a pipe coating facility. As the end portions of the first and second pipe sections 10, 12 shown in the drawings are of identical construction, the same reference numerals will be used below and in the drawings to identify their common elements.

Each pipe section 10, 12 includes a steel pipe 14 having a cylindrical outer surface 16. The end 15 of the pipe 14 has an annular connection surface 18 which is at a right angle to the outer surface 16. The insulated pipe sections 10, 12 have a line pipe coating comprising a plurality of layers. The line pipe coating includes at least a corrosion protection layer 20 on the outer surface 16 of steel pipe 14, and a pipe insulation layer 22 provided over the corrosion protection layer 20.

It will be appreciated that other functional layers may be integrated into the line pipe coating of pipe sections 10, 12 without departing from the scope of the invention. For example, insulated pipe sections 10, 12 may include more than one corrosion protection layer or more than one layer of pipe insulation. In addition, pipe sections 10, 12 may include other types of functional layers, such as thermal barriers, adhesive layers, and outer abrasion-resistant or protective top coats. The functional layers of the line pipe coatings of sections 10 and 12 may include those described in above-mentioned U.S. Provisional Patent Application No. 61/863,976 by Wan et al.

Although the corrosion protection layer 20 of the line pipe coating is described herein as comprising a single layer, it may instead be comprised of multiple layers of different composition. The corrosion protection layer 20 comprises a high temperature corrosion protection material and may be selected from the group comprising epoxy phenolics, polyphenylene sulphides, fluoropolymers, polyimides, or high temperature fusion bonded epoxy (FBE), including modified versions and blends thereof. For example, the FBE may be a high-temperature epoxy as defined in above-mentioned U.S. patent application Ser. No. 14/193,663 by Edmondson et al. Also, as disclosed by Edmondson et al., the high-temperature epoxy may comprise an epoxy novolac-based coating capable of continuous operation at or above about 200° C., wherein epoxy novolac resins comprise epoxy functional groups on a phenol formaldehyde backbone.

An adhesive layer may optionally be provided to bond the corrosion protection layer 20 to the pipe surface 16 or to a subsequently applied layer.

The pipe insulation layer 22 comprises a polymer having a thermal conductivity of less than about 0.40 W/mk; for example about 0.10 to 0.35 W/mK; and/or heat resistance at continuous operating temperatures of at least about 200° C. For example, the pipe insulation layer 22 may comprise a layer of fluoropolymer as described in above-mentioned U.S. Provisional Patent Application No. 61/863,976 by Wan et al. The fluoropolymer may be a fluoroelastomer or a fluorocarbon thermoplastic as described by Wan et al. For example, pipe insulation layer 22 of FIG. 1 includes a first, innermost layer 22A comprising a fluoropolymer.

In some embodiments, the pipe insulation layer 22 may comprise an elastomer selected from hydrogenated nitrile butadiene rubber (HNBR) and nitrile butadiene rubber (NBR). For example, a layer of NBR or HNBR can be applied as a second layer 22B on top of an innermost layer 22A of fluoropolymer. Alternatively, a layer of HNBR or a blend of HNBR/fluoropolymer can be used as an innermost layer 22A of pipe insulation in some systems. For example, where the innermost layer 22A comprises HNBR, the maximum operating temperature of the system is about 180° C. In the embodiment of FIG. 1, pipe insulation layer 22 includes a second layer of insulation 22B located on top of the first layer 22A, wherein the second layer 22B comprises HNBR.

In some embodiments, the pipe insulation layer 22 may comprise a layer of thermoplastic or an epoxy-modified polymer network, as a further insulating layer and/or as a protective topcoat. For example, the thermoplastic or epoxy-modified polymer network layer, such as a network epoxy modified urethane or olefin, can be applied as a second layer 22B on top of a first layer 22A which may comprise a fluoropolymer and/or HNBR, as discussed above. Alternatively, as shown in FIG. 1, the thermoplastic or epoxy-modified polymer network may be applied as a third layer 22C on top of the second layer 22B, and may comprise the outermost layer of the line pipe coating. The compositions of epoxy-modified polymer networks are further discussed below.

As shown in FIG. 1, each of the insulated pipe sections 10, 12 has a bare end portion 24 in which the outer surface 16 of the steel pipe 14 is exposed. The bare end portion 24 extends from the end 15 of pipe 14 to a terminal end of either the corrosion protection layer 20 or the pipe insulation layer 22. The bare end portions 24 are formed during manufacturing and are provided to avoid damage to the layers 20, 22 when the ends of the insulated pipe sections 10, 12 are heated during welding. The lengths of the bare end portions 24 of pipe sections 10, 12 may be the same or different, and depend at least partially on the equipment used for welding and/or field jointing, and on the steel pipe wall thickness, and may be on the order of about 150-1,500 mm.

The pipe insulation layer 22 of each pipe section 10, 12 has a terminal end 26 which is spaced from the end 15 of pipe 14. The pipe insulation layer 22 is provided with a chamfer 28 which commences at the terminal end 26 and slopes radially outwardly and away from the end 15 of pipe 14, the chamfer 28 typically being sloped at an angle of from about 20 to 60 degrees. The radially inward-most portion of the chamfer 28, located at the terminal end 26 of the pipe insulation layer 22, is sometimes referred to herein as the "chamfer toe".

The corrosion protection layer 20 of each insulated pipe section 10, 12 may extend past the chamfer toe 26 such that a distance between the terminal end 30 of the corrosion protection layer 20 and the end 15 of pipe 14 is less than a distance between the chamfer toe 26 and the end 15 of pipe 14. Thus, the bare end portion 24 of each insulated pipe section 10, 12 extends from the end 15 of pipe 14 to the terminal end 30 of the corrosion protection layer 20. This construction provides an exposed end portion 32 of the corrosion protection layer 20 which extends beyond the chamfer toe 26, sometimes referred to herein as the "lip" of the corrosion protection layer 20. The axial length of lip 32 is typically from about 5-50 mm, typically at least about 10 mm.

Figure 3A:
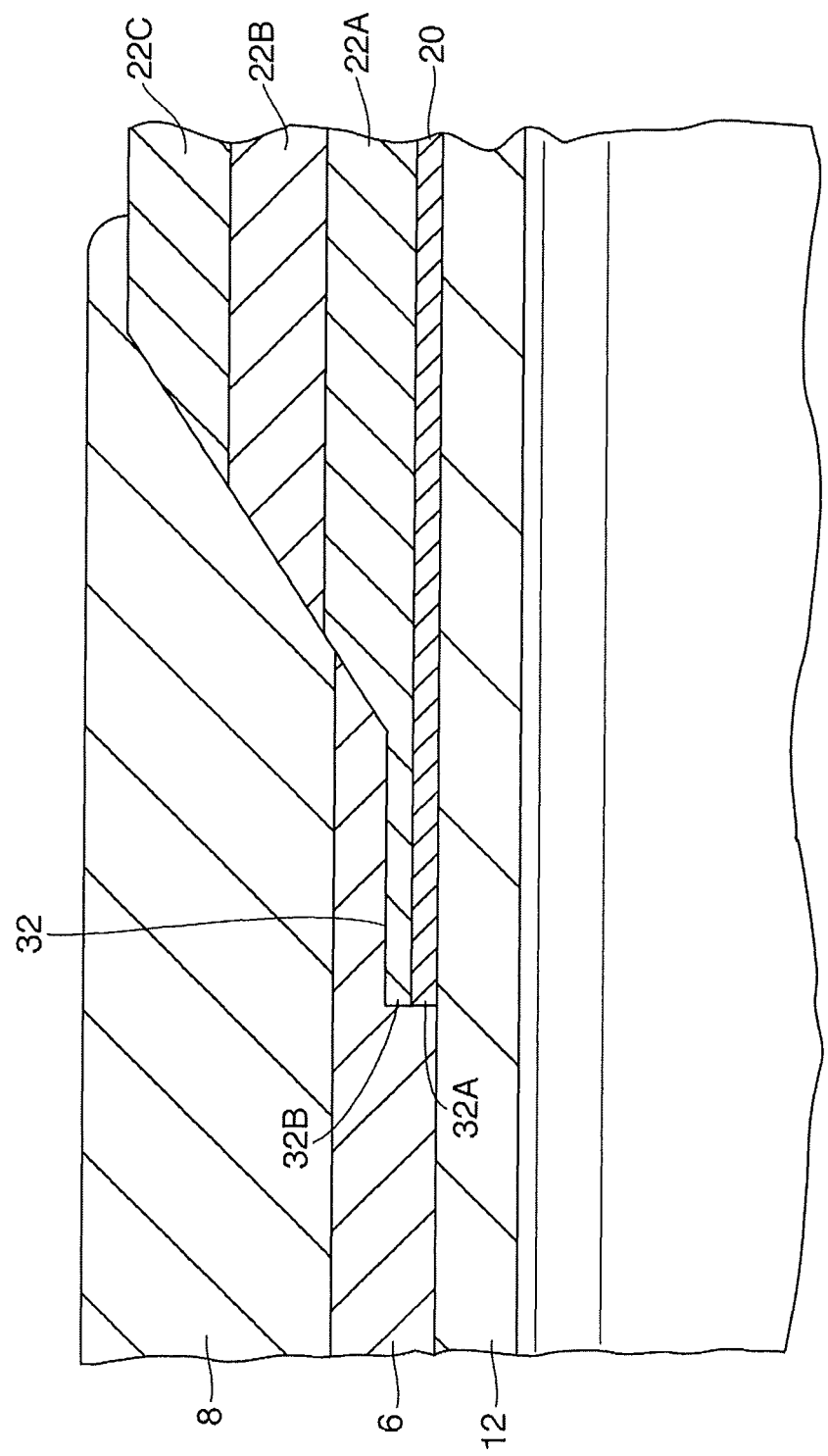

In some embodiments, as shown in the close-up of FIG. 3A, the lip 32 may comprise multiple layers. The innermost layer 32A of a multi-layer lip 32 comprises the exposed end portion of the corrosion protection layer 20 described above. The multi-layer lip 32 also includes an outer layer 32B of thermal insulation of the same composition as the insulation layer 22, or the first layer 22A thereof, in the case of a multi-layer insulation layer 22. The outer layer 32B of lip 32 will typically be integrally formed with the insulation layer 22, for example by leaving a layer of thermal insulation when forming the chamfer 28. Typically, the layers 32A and 32B may be of substantially the same thickness. The multi-layer construction of lip 32 may be used, for example, where the first field joint insulation layer 6, described below, is of the same or similar composition as the insulation layer 22, or the first layer 22A thereof, so as to provide improved bonding between the first layer of field joint insulation 6 and the insulation layer 22 of the line pipe coating. In this embodiment, the anti-corrosion coating 38 of the field joint coating may be eliminated, with the first layer of field joint insulation 6 being applied directly to the outer surfaces 16 of pipes 10, 12, optionally with the use of an adhesive layer (not shown) between the pipe surface 16 and the first thermal insulation layer 6.

Prior to joining the pipes 10, 12 and applying the field joint insulation system, the bare end portions 24 of the insulated pipe sections 10, 12 may be subjected to a cleaning pretreatment in order to ensure that the outer surfaces of the bare end portions 24 are substantially free from oil, grease, dirt, mill scale, rust, paint and foreign matter, so as to promote bonding with the field joint coating. The pretreatment may comprise a blast cleaning of the bare end portions 24, which may be performed as an "off-line" step in the factory, for example as disclosed in above-mentioned U.S. patent application Ser. No. 12/794,402 by Jackson et al.

Figure 2:
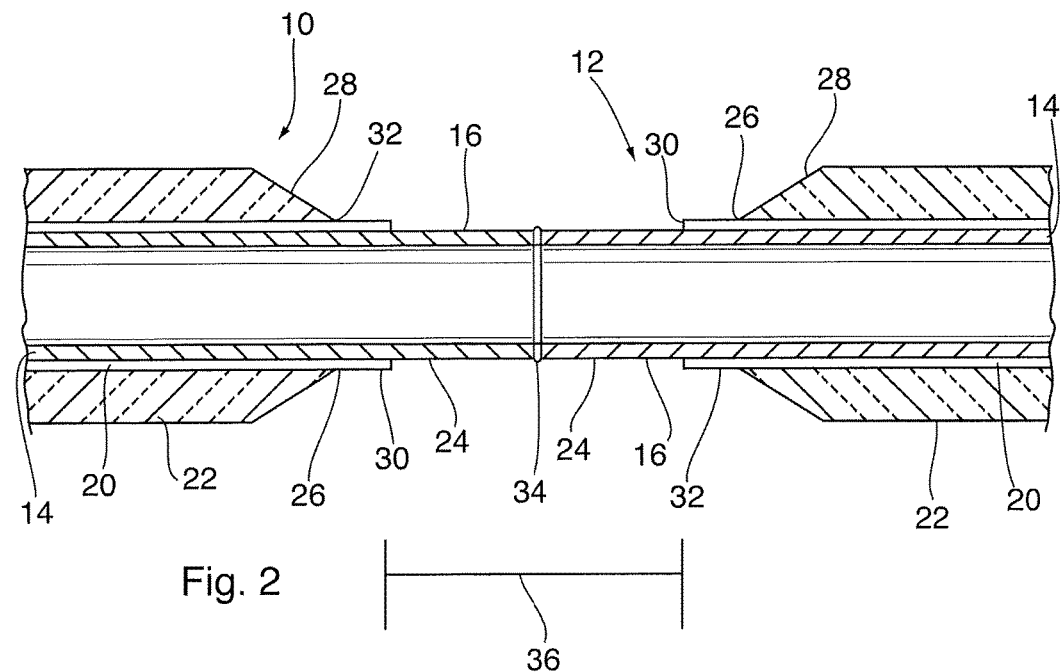
FIG. 2 is a cross-sectional view showing the insulated pipe segments of FIG. 1 after being joined by welding.

The insulated pipe sections 10, 12, are positioned end-to-end with their annular connection surfaces 18 abutting one another, and are then butt welded together to form a circumferential girth weld 34 as shown in FIG. 2. During welding, the ends 15 of steel pipes 14 are heated to a sufficiently high temperature for welding and a molten weld filler metal is applied to join the pipes 14 together and to fill any gaps between the annular connection surfaces 18. After welding, and prior to further processing, the heated area is permitted to cool. The welding step results in the formation of a continuous circumferential weld joint 34 between the annular connection surfaces 18 of steel pipes 14, and this is shown in FIG. 2. The weld joint 34, together with the bare end portions 24 of insulated pipe sections 10, 12, form a continuous joint area 36 which is defined herein as comprising the entire area over which the outer surfaces of pipes 14 are exposed. The steel pipes 14 of pipe sections 10, 12 are locally heated proximate to their ends 15 during the welding operation. The lengths of bare end portions 24 are of sufficient lengths to prevent excessive heating of the corrosion protection layer 20 and the pipe insulation layer 22.

In some embodiments, an anti-corrosion coating 38 is applied to the joint area 36 after welding. The anti-corrosion coating 38 has a long-term resistance to temperatures from about 150° C. to above about 205° C., and may comprise any of the materials mentioned above with reference to the corrosion protection layer 20, and optionally including an adhesive layer.

Alternatively, the anti-corrosion coating 38 may comprise a silicone elastomer having a long-term resistance to temperatures from about 150° C. to above about 205° C. The silicone elastomer may be a room temperature vulcanizing (RTV) silicone elastomer comprising polydimethylsiloxane. RTV silicone elastomers are curable at ambient and elevated temperatures, i.e. by condensation or addition curing. For example, suitable RTV elastomers for use in the anti-corrosion coating include single component (RTV-1) silicone elastomers which are curable by condensation curing by reaction between hydroxyl groups of the elastomer and atmospheric moisture. Suitable RTV elastomers also include dual component (RTV-2) silicone elastomers which are curable by condensation curing or by an addition reaction between vinyl functional siloxane polymers and silicon-hydrogen oligomers. Addition curing will proceed at ambient temperature but is significantly faster at elevated temperature. Also, the concentration of oligomer affects curing time, and therefore the curing time of the silicone elastomer can be tailored by controlling the temperature and/or the concentration of oligomer.

The anti-corrosion coating 38 is applied over the entire joint area 36, including the weld joint 34 and the bare end portions 24, so as to provide a continuous corrosion protection layer in the joint area 36. The anti-corrosion coating 38 may be applied by spraying or brushing to a thickness of about 100-2000 micrometers, for example about 500-1500 micrometers.

The anti-corrosion coating 38 at least partially overlaps the exposed end portions 32 of corrosion protection layers 20. In order to improve adhesion to the anti-corrosion coating 38, the exposed lip 32 of corrosion protection layers 20 may be lightly abraded prior to application of the anti-corrosion coating 38, the abrasion being performed either in the factory or in the field.

Alternatively, or in addition to this abrasive pretreatment, an adhesive may be applied to one or more of the chamfer 28, the chamfer toe 26, and the exposed lip 32 of corrosion protection layer 20, so as to improve adhesion to the anti-corrosion coating 38 and/or to subsequently applied insulation layers. Alternatively, one or more of the chamfer 28, the chamfer toe 26, and the exposed lip 32 of corrosion protection layer 20 may be surface activated by flame treatment, corona discharge treatment, or plasma treatment to create reactive functional groups on its outer surface to improve bonding to the anti-corrosion coating 38 and/or to subsequently applied insulation layers.

The anti-corrosion coating 38 typically does not overlap the chamfers 28 to any significant extent. In fact, the chamfer 28 may be masked, for example with tape, so as to prevent the anti-corrosion coating 38 from overlapping the chamfer 28.

An alternate method of masking the chamfers 28 is to at least partially coat them with a chamfer inhibition barrier 50 so as to prevent direct contact between the chamfer 28 and any subsequently applied layers, as further discussed below with reference to FIGS. 3, 4 and 5. The chamfer inhibition barrier 50 may comprise a layer of a RTV silicone elastomer which may be the same or different from the RTV silicone elastomer comprising the anti-corrosion coating 38. For example, the chamfer inhibition barrier 50 may comprise an RTV-1 silicone elastomer, particularly in a system where the anti-corrosion coating 38 of the field joint comprises a RTV-2 silicone elastomer, since the curing of the RTV-2 elastomer may be inhibited by the chemistry of certain types of polymers used in the line pipe coating, such as fluoropolymers.

The chamfer inhibition barrier 50 may be applied by spraying or brushing to a thickness of about 100-2000 micrometers, for example about 500-1500 micrometers. Because the chamfer inhibition barrier 50 is applied to prevent inhibition of curing in the anti-corrosion coating 38, it will only need to be applied to the thickness of the anti-corrosion coating 38. Therefore, the chamfer inhibition barrier 50 may only be required over the toe 26 of chamfer 28, as in FIG. 3.

An adhesive may be applied to the chamfer inhibition barrier 50 to improve adhesion to the anti-corrosion coating 38. Such an adhesive layer 52 is shown in FIG. 5 and discussed below with reference to Embodiment 3. Alternatively, the chamfer inhibition barrier 50 may be surface activated by flame treatment, corona discharge treatment, or plasma treatment to create reactive functional groups on its outer surface to improve bonding to the anti-corrosion coating 38.

After it is applied to pipes 10, 12, the anti-corrosion coating 38 is at least partly cured prior to further processing. Although anti-corrosion coatings 38 comprising RTV silicone elastomers will eventually cure at ambient temperatures, it may be desired to heat the anti-corrosion coating 38 to accelerate curing. This may be accomplished by selectively pre-heating the steel pipes 10, 12 within the joint area 36 immediately before application of the anti-corrosion coating 38, or by heating the anti-corrosion coating 38 after it is applied.

The next step in the method is to apply a first field joint insulation layer 6 over the joint area 36 and at least partially covering chamfers 28. An adhesive may be applied to the anti-corrosion coating 38 and/or chamfers 28 to improve adhesion to subsequently applied insulation layers. Alternatively, the anti-corrosion coating 38 and/or the chamfers 28 may be surface activated by flame treatment, corona discharge treatment, or plasma treatment to create reactive functional groups on its outer surface to improve bonding to the subsequently applied insulation layers.

Due to its proximity to the outer surfaces 16 of pipes 10, 12, the first field joint insulation layer 6 has a long-term resistance to temperatures from about 150° C. to above about 205° C. The first field joint insulation layer 6 is also designed to exhibit adequate compressive creep resistance and modulus at these temperatures, and hence maintain the required thermal insulation properties over the lifetime of the oil and gas recovery project. In addition, the compositions should be sufficiently ductile to withstand the bending strains experienced by the insulated pipe during reeling and installation operations.

In some embodiments, the first field joint insulation layer 6 comprises a high temperature resistant fluoroelastomer and/or HNBR selected to provide the first field joint insulation layer 6 with one or more of the following properties:

thermal conductivity of less than about 0.40 W/mk; for example about 0.10 to 0.35 W/mK, typically from about 0.15-0.30 W/mK;

heat resistance at continuous operating temperatures within the range from about 150° C. to above about 205° C.

The first field joint insulation layer 6 may be foamed or solid. Where the first field joint insulation layer 6 is foamed, it may either be a blown foam or a syntactic foam having a degree of foaming of up to about 50%, for example from about 5% to about 30%.

The first field joint insulation layer 6 is applied at a sufficient thickness to provide the insulated transport conduit with an acceptable heat transfer coefficient (U) for the conditions under which it is to be used, with U typically being in the range from about 1 to about 10 W/m²K, for example from about 2 to about 8 W/m²K.

The thickness of the first field joint insulation layer 6 is highly variable, due to the fact that each pipeline system is designed for use under specific conditions of depth, temperature etc., and also depending on whether or not the field joint includes one or more additional layers of thermal insulation. In some embodiments, the thickness of the first field joint insulation layer 6 ranges from about 10 mm to a thickness which is greater than that of the line pipe coating.

For example, the first field joint insulation layer 6 may comprise a fluoropolymer composition, which provides the first field joint insulation layer 6 with heat resistance at the above-mentioned operating temperatures, resistance to chemicals and harsh environments, strength, processibility etc. The fluoropolymer may comprise a crosslinked (vulcanized) fluoroelastomer or a fluorocarbon thermoplastic. The fluoropolymer composition of the first field joint insulation layer 6 may either be solid or a syntactic foam, and may comprise any of the compositions disclosed in above-mentioned U.S. Provisional Patent Application No. 61/863,976 by Wan et al.

For example, suitable fluoropolymer compositions may, for example, comprise copolymers of tetrafluoroethylene (TFE) and propylene, also known as TFE/P or FEPM copolymers, which are fluoroelastomers predominantly comprised of tetrafluoroethylene units ($-CF_2-CF_2-$) and propylene units ($-CH_2-CH(CH_3)-$).

Alternate fluoroelastomers which may be used in the first field joint insulation layer include those known as Type 1 to Type 5 FKMs, including:

Type 1 FKMs comprising copolymers of vinylidene fluoride (VDF) and hexafluoropropylene (HFP), such as those known as Viton™, Dyneon™, Dai-EI™, Tecnoflon™ and Fluorel™;

Type 2 FKMs comprising terpolymers of VDF, HFP and tetrafluoroethylene (TFE);

Type 3 FKMs comprising copolymers of VDF, HFP, TFE and perfluoromethylevinyl ether (PMVE);

Type 4 FKMs comprising terpolymers of VDF, TFE and propylene; and

Type 5 FKMs comprising copolymers of VDF, HFP, TFE, PMVE, ethylene FFKM perfluoroelastomers (such as Kalrez™, Tecnoflon PFR™, and Perlast™), and fluorosilicone rubbers (FVMQ).

Instead of an elastomer, the fluoropolymer may comprise a fluorocarbon thermoplastic such as perfluoroalkoxy (PFA) copolymer of polytetrafluoroethylene and perfluoro alkyl vinyl ether; polytetrafluoroethylene (PTFE); fluorinated ethylene propylene (FEP); a copolymer of tetrafluoroethylene and hexafluoroethylene; and/or polyvinylidene fluoride (PVDF).

A suitable fluoroelastomer composition for use in the first field joint insulation layer 6 is commercially available from AGC Chemicals (Asahi Glass Co., Ltd.) under the trademark AFLAS™. For example, suitable fluoroelastomer compositions include AFLAS™ 100, AFLAS™ 150, and AFLAS™ 300, based on copolymers having the repeating structure $-(CF_2CF_2)-(CH_2CH(CH_3))_m-$; and AFLAS™ 200, based on copolymers having the repeating structure $-(CF_2CF_2)-(CH_2CH(CH_3))_m-(CF_2CF_2)_n-$. AFLAS™ copolymer compositions provide the first field joint insulation layer 6 with high heat resistance and high chemical resistance.

Once crosslinked, the fluoropolymer composition is a thermoset material, and does not soften or melt when heated. For example, the decomposition temperature of the crosslinked propylene-tetrafluoroethylene copolymer is about 415° C.

It will be appreciated that the fluoropolymer compositions comprising the first field joint insulation layer 6, as discussed above, may also be used in the pipe insulation layer 22 of the line pipe coating.

In other embodiments, the first field joint insulation layer 6 may comprise a silicone elastomer having long-term resistance to temperatures from about 150° C. to above about 205° C., including any of the RTV-1 and RTV-2 silicone elastomers mentioned above.

As mentioned above, the first field joint insulation layer 6 may comprise HNBR having long-term resistance to temperatures from about 150° C. to about 180° C. Alternatively, the first field joint insulation layer 6 may comprise a blend of HNBR with one of the fluoropolymers mentioned above, such blends having long-term resistance to temperatures greater than the maximum for HNBR (about 180° C.) and less than the maximum for fluoropolymers (above about 205° C.).

As for the method of application, the first field joint insulation layer 6 may be applied to the joint area 36 by casting, wherein an annular mold is applied over the joint area 36 and the mold cavity is filled with the first field joint insulation layer 6 in the form of a molten resin. The mold may optionally be left in place over the joint to provide the field joint with an outer shell. In an alternative methodology, the field joint insulation may also be applied via wrapping of extruded or pre-prepared sheets or strips, or the application of pre-formed shells, wherein the sheets, strips of shells are either uncured or partially cured when applied to the joint area 36.

In some of the embodiments disclosed herein, the first field joint insulation layer 6 is applied over the anti-corrosion coating 38. As mentioned above, the anti-corrosion coating 38 may be provided with an adhesive layer or may be subjected to a surface-activating pre-treatment to improve adhesion with the first field joint insulation layer 6.

In other embodiments, the anti-corrosion coating 38 is eliminated and the first field joint insulation layer 6 is applied directly to the bare pipes 10, 12 in the weld joint area 36, optionally with an adhesive between the pipes 10, 12 and the insulation layer 6. These embodiments may be used in situations where both the line pipe insulation layer 22 and the field joint insulation layer 38 comprise a fluoropolymer, and where the lip 32 includes an outer layer 32B comprised of the line pipe thermal insulation.

The first field joint insulation layer 6 may be cured immediately upon application to the joint area 36. In some embodiments, the curing of the first field joint insulation layer 6 may be assisted by the application of heat to the joint area 36. In this regard, the joint area 36 may be pre-heated by induction heating of the steel pipes 10, 12, for example by advancing the pipe sections 10, 12 through an induction heating apparatus which selectively preheats the steel pipe in the joint area 36 immediately before application of the first field joint insulation layer 6.

In some embodiments, the first field joint insulation layer 6 may be cured in operation. In these embodiments, the first field joint insulation layer 6 is left partially or completely uncured after it is applied, and is subsequently cured when the insulated pipeline is heated during use.

In embodiments where the first field joint insulation layer 6 is the only layer of thermal insulation applied to the joint area 36, the first field joint insulation layer 6 is applied to a thickness sufficient to completely fill the volume of the joint area 36, completely covering the chamfers 28 of the pipes 10, 12, and possibly overlapping the line coatings of the pipes 10, 12 on both sides of the joint area 36.

In other embodiments, the first field joint insulation layer 6 may be applied as a thermal barrier, so as to only partially fill the volume of the joint area 36. In these embodiments, the field joint will include at least a second field joint insulation layer 8 applied over the first field joint insulation layer 6. Depending on the compositions of the first and second insulation layers 6, 8, it may be desired to include a layer of adhesive between layers 6 and 8 so as to improve interlayer adhesion. Alternatively, the first field joint insulation layer 6 may be surface activated by flame treatment, corona discharge treatment, or plasma treatment to create reactive functional groups on its outer surface to improve bonding to the subsequently applied second layer 8.

Because the outer surface of the first field joint insulation layer 6 will be at a lower temperature than the operating temperature of the conduit, when the conduit is in use, the second field joint insulation layer 8 may not necessarily require the same level of high temperature resistance. Therefore, the composition of the second field joint insulation layer 8 is highly variable.

For example, the second field joint insulation layer 8 may comprise a thermoplastic, such as conventional polyethylene, polypropylene, polybutylene, polyurethane and copolymers, blends and elastomers thereof. Alternatively, the second field joint insulation layer 8 may comprise any of the thermoplastics disclosed in US Patent Application Publication No. US 2009/0159146 A1 by Jackson et al. or U.S. Pat. No. 8,397,765 by Jackson et al., both of which are incorporated herein by reference in their entireties. The second field joint insulation layer 8 may instead comprise an elastomeric material different from that of the first field joint insulation layer 6, such as a hydrogenated nitrile butadiene rubber (HNBR), nitrile butadiene rubber (NBR), silicone rubber, ethylene propylene diene monomer (EPDM) rubber, or butyl rubber.

In a specific embodiment, the second field joint insulation layer comprises an epoxy-modified polymer network, such as an epoxy-urethane hybrid system or an epoxy-olefin hybrid system. Such systems are sometimes referred to as network epoxy modified urethanes or network epoxy modified olefins. These epoxy-modified polymer networks typically have a temperature rating from about 90° C. to about 140° C.

The second field joint insulation layer 8 may be foamed or solid. Where the second field joint insulation layer 8 is foamed, it may either be a blown foam or a syntactic foam having a degree of foaming of up to about 50%, for example from about 5% to about 30%.

The thickness of the second field joint insulation layer 8 is also highly variable and, in some embodiments, the second field joint insulation layer 8 may extend to a thickness greater than that of the line pipe coating.

As mentioned above, one or more of the field joint insulation layers may also be provided with an additional protective layer, or topcoat 9 comprised of unfoamed polymeric material. The topcoat 9 may be prepared from the same or different material as one of the underlying field joint insulation layers 6 and/or 8, or a modified or reinforced version thereof. Alternatively, the topcoat 9 may comprise a metal shell.

It may be required, for example, to impart a higher degree of physical or chemical performance, such as impact, abrasion, crush or moisture resistance, to the outer surface of the insulated pipe, in which case it may be advantageous to prepare the outer protective topcoat 9 from a polymeric material having superior impact, abrasion, crush or chemical resistance to that from which the field joint insulation layer, or layers, is made. Such a material may comprise the thermal insulation material blended with suitable polymeric modifiers, compatibilisers, or reinforcing fillers or fibres, or it may comprise a dissimilar, preferably compatible, polymeric material.

Any of the thermal insulation layers may contain additives selected from one or more members of the group comprising inorganic fillers, reinforcing fillers or fibres, nano-fillers, conductive fillers, flame-retardant fillers, anti-oxidants, heat-stabilisers, process aids, compatibilisers, organic fillers, and pigments.

Specific embodiments of the above-described field joint systems and methods are described below, with reference to FIGS. 3 to 5. It will be appreciated that the thicknesses of the layers and coatings shown in FIGS. 3 to 5 are not shown to scale.

The insulated pipe segments 10, 12 according to the following embodiments are provided with a line pipe coating comprising:

1. a corrosion protection layer 20 applied directly to the bare outer surface 16 of the pipes 10, 12, the layer 20 comprising an epoxy phenolic;

2. an adhesive layer (not shown) applied over the corrosion protection layer 20;

3. a first pipe insulation layer 22A comprising a fluoroelastomer composition, applied over the adhesive layer;

4. a second pipe insulation layer 22B comprising an elastomeric material different from that of the first pipe insulation layer 22A, such as a HNBR and/or NBR;

5. a third pipe insulation layer 22C comprising an epoxy-modified polymer network as described above, for example network epoxy modified urethane.

The line pipe coating has a chamfer 28 with an exposed lip 32 of the corrosion protection layer 20 extending at least 10 mm past the chamfer toe 26.

Embodiment 1 (FIG. 3)

The chamfers 28 of pipes 10, 12 were optionally masked by applying a chamfer inhibition barrier 50 comprising a silicone elastomer, such as any of the RTV-1 silicone elastomers described above, to at least the toes 26 of chamfers 28. The chamfers 28 were preheated to about 100° C. before the chamfer inhibition barrier 50 was applied to chamfers 28 by spraying. The thickness of the chamfer inhibition barrier 50 was about 1000 micrometers. The chamfer inhibition barrier 50 was cured by heating (baking).

Optionally, an anti-corrosion coating 38 comprising a silicone elastomer, such as any of the RTV-2 silicone elastomers described above, was then applied to the joint area 36, to at least partially overlaps the lip 32 of the corrosion protection layer 20. The anti-corrosion coating has a thickness of about 500 to 1,500 micrometers and is applied by spraying. The anti-corrosion coating 38 was cured by heating (baking).

A first field joint insulation layer 6 in the form of a thermal barrier was then applied over the joint area 36, partially filling the joint area 36 and partially overlapping the chamfers 28. The layer 6 comprised a fluoroelastomer composition (AFLAS™), which was applied in uncured or partially cured form in the form of a sheet which is wrapped around the joint area 36. The fluoroelastomer had a temperature rating of about 205° C. and a thickness of about 50 mm.

Before, during and/or after the application of the first field joint insulation layer 6, the steel pipes 10, 12 were induction heated to at least partially cure the first field joint insulation layer 6. However, as discussed above, this curing step is optional, and the first field joint insulation layer 6 may instead be cured during operation of the pipeline. The joint area 36 and chamfers 28 were then pre-heated to about 80° C. and a second field joint insulation layer 8 was applied over the first field joint insulation layer 6. The second field joint insulation layer 8 was applied by casting in a sheet metal mold to a sufficient thickness to completely fill the joint area 36, completely cover the remainder of chamfers 28, and overlap the outer surface of the line pipe coating. The total thickness of the second field joint insulation layer was about 50-60 mm, and the overlap at each end of the joint area 36 was about 8 mm in thickness and about 70 mm in axial length.

Depending on the compositions of the first and second insulation layers 6, 8, it may be desired to include a layer of adhesive between layers 6 and 8 so as to improve interlayer adhesion. Alternatively, the first field joint insulation layer 6 may be surface activated by flame treatment, corona discharge treatment, or plasma treatment to create reactive functional groups on its outer surface to improve bonding to the subsequently applied second layer 8. The surface activation may optionally be used in combination with the heating step discussed above. The second field joint insulation layer 8 comprised a network epoxy modified urethane composition having a temperature rating of about 95° C. The network epoxy modified urethane composition cures exothermically and no external heat was required to cure the second field joint insulation layer 8. Instead of the network epoxy modified urethane composition, the second field joint insulation layer 8 may have comprised a network epoxy modified olefin composition.

Figure 4:
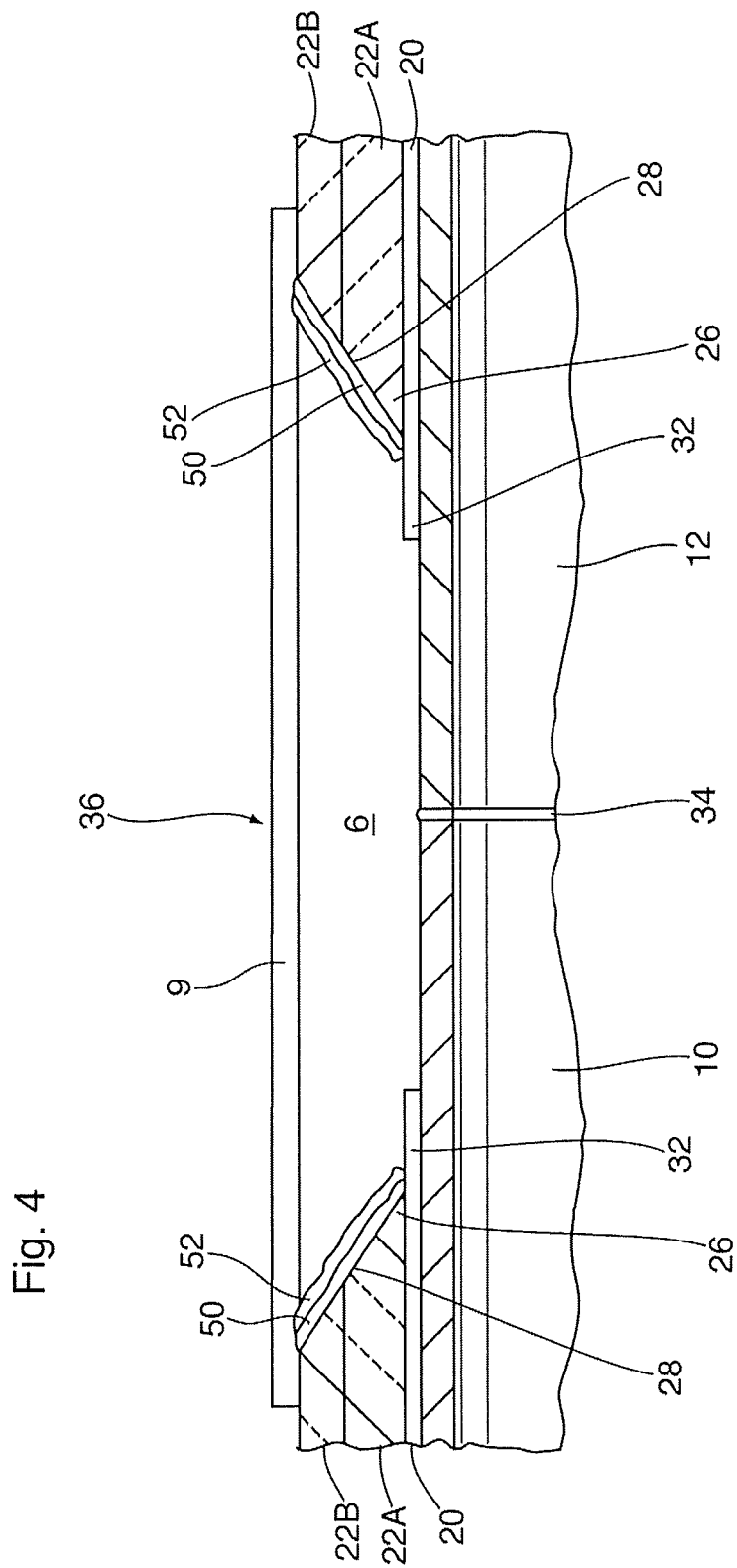

Embodiment 2 (FIG. 4)

The chamfers 28 of pipes 10, 12 were masked by applying a chamfer inhibition barrier 50 comprising a silicone elastomer, such as any of the RTV-1 silicone elastomers described above. The chamfers 28 were preheated to about 100° C. prior to application of the chamfer inhibition barrier 50 by spraying to a thickness of about 1000 micrometers. The chamfer inhibition barrier 50 was fully cured by heating (baking).

An adhesive layer 52 was then applied over the chamfers 28. The adhesive layer comprised a RTV-1 silicone elastomer was applied to chamfers 28 by spraying to a thickness of about 1000 micrometers. The chamfer inhibition barrier was semi-cured by heating (baking).

A first field joint insulation layer 6 was then applied over the adhesive layer 52 and over the entire joint area 36. The first field joint insulation layer 6 comprised a silicone elastomer, such as any of the RTV-2 silicone elastomers described above, and was applied by casting in a sheet metal mold to a sufficient thickness to completely fill the joint area 36 and completely cover the chamfers 28, so as to be substantially flush with the outer surface of the line pipe coating. The total thickness of the first field joint insulation layer 6 was about 80-100 mm.

A polyethylene heat shrink sleeve was then applied over the first insulation layer 6 as a protective shield or top coat 9. The sleeve overlapped each end of the joint area 36 by an axial length of about 70 mm.

Figure 5:
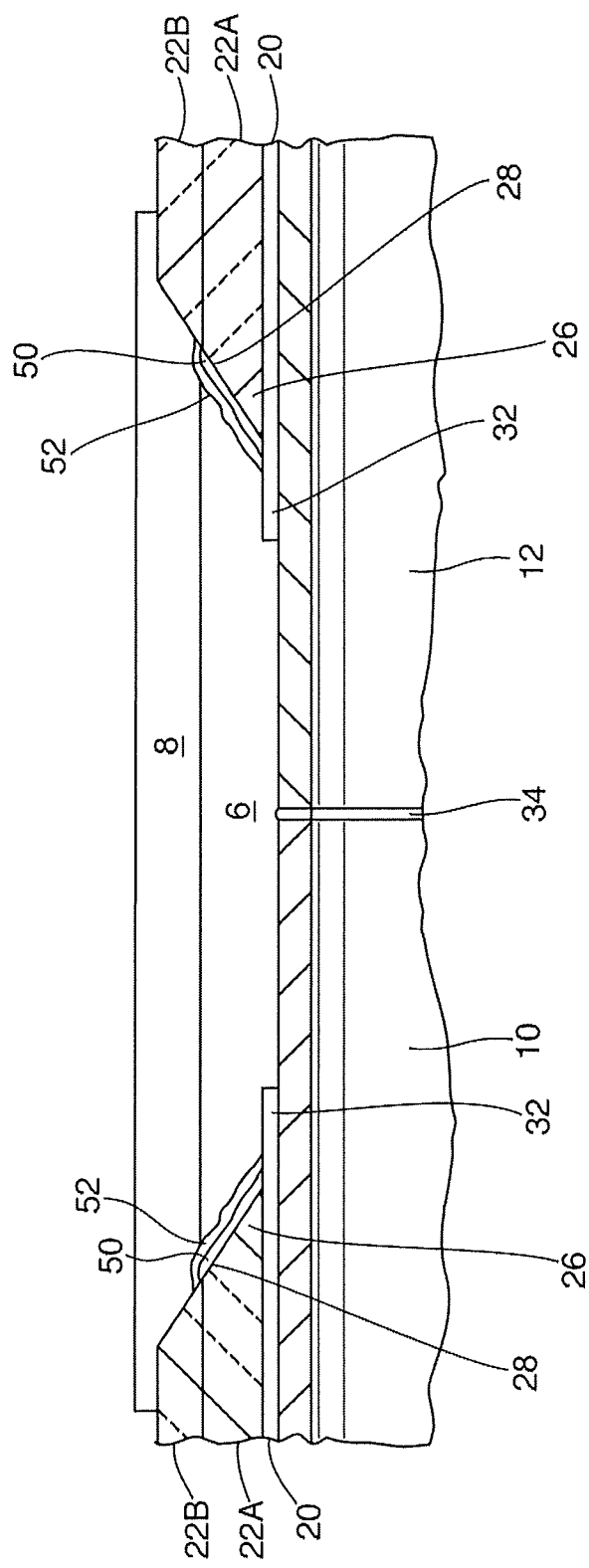

Embodiment 3 (FIG. 5)

The chamfers 28 of pipes 10, 12 were partially masked by applying a chamfer inhibition barrier 50 comprising a silicone elastomer, such as any of the RTV-1 silicone elastomers described above. The chamfers 28 were preheated to about 100° C. prior to application of the chamfer inhibition barrier 50 by spraying to a thickness of about 1000 micrometers. The chamfer inhibition barrier 50 was fully cured by heating (baking).

An adhesive layer 52 was then applied over the masked portions of chamfers 28. The adhesive layer 52 comprised a RTV-1 silicone elastomer and was applied to chamfers 28 by spraying to a thickness of about 1000 micrometers. The adhesive layer 52 was semi-cured by heating (baking).

A first field joint insulation layer 6 was then applied over the adhesive layer. The first field joint insulation layer 6 comprised a silicone elastomer, such as any of the RTV-2 silicone elastomers described above, and was applied by casting in a sheet metal mold to partially fill the joint area 36 and partially overlap the chamfers 28 to a thickness of about 50-60 mm.

A second field joint insulation layer 8 was then applied over the first insulation layer 6. Prior to applying the second layer 8, the first layer 6 was preheated to about 80° C. to remove surface moisture and to help cure the subsequently applied second layer 8. Also, the first field joint insulation layer 6 was surface activated so as to ionize the silicone to create reactive functional groups on the surface of the first layer 6 and improve adhesion to the subsequently applied second layer 8. The surface activation comprised flame treatment, corona discharge treatment, or plasma treatment.

The second field joint insulation layer 8 comprised a network epoxy modified urethane composition having a temperature rating of about 95° C. The second field joint insulation layer 8 was applied by casting in a sheet metal mold to a sufficient thickness to completely fill the joint area 36, completely cover the remainder of chamfers 28, and overlap the outer surface of the line pipe coating. As mentioned above, the second field joint insulation layer 8 may have comprised a network epoxy modified olefin composition, and/or the sheet metal mold may have been left in place to provide an outer metal shell over the field joint. The total thickness of the second field joint insulation layer 8 was about 50 mm, and the overlap at each end of the joint area 36 was about 8 mm in thickness and about 70 mm in axial length.

Where adhesive layers are mentioned herein, it will be appreciated that the composition of the adhesive layer will depend at least partly on the compositions of the layers being bonded together. For example, adhesives used herein may be polymers or reactive systems with functionalities having mutual affinity to the layers being bonded, the functionalities being specific to the chemical composition of the layers being bonded. Preferably the adhesive should provide a bond strength sufficient to promote cohesive failure between the layers being bonded.

The adhesive layer between adjacent thermal insulation layers and between a thermal insulation layer and one or more of adjacent layers may, for example, comprise a grafted polymer or copolymer, or polymer blend with one or more moieties compatible with each of the individual layers to be bonded.

In embodiments where the first thermal insulation layer 6 comprises a fluoroelastomer, the first thermal insulation layer 6 may be bonded to an adjacent layer by an adhesive which bonds to the fluoroelastomer during vulcanization. Such an adhesive may be a liquid adhesive specially formulated for vulcanization/bonding of elastomers to steel and other rigid substrates, such as those disclosed in above-mentioned U.S. Provisional Patent Application No. 61/863,976 by Wan et al.

Although the invention has been described in connection with corrosion protection, mechanical protection and insulation of welded joints between sections of coated pipe sections, it will be appreciated that the layered field joint coatings described herein may also be applied to other components of subsea oil and gas production systems, including components having more complicated, non-linear structures. Such components include bends, flanges, manifolds, valves, fittings, etc., and other components of subsea oil and gas production systems requiring corrosion protection, mechanical protection and/or thermal insulation. Therefore, as used herein, terms such as "pipe", "pipe section", "pipeline" and "insulated conduit" include other components of subsea oil and gas production systems, including those named above.

Although the invention has been described in connection with certain embodiments, it is not limited thereto. Rather, the invention includes all embodiments which may fall within the scope of the following claims.

What is claimed is:

1. A method for forming a field joint between two insulated pipe sections, the method comprising:
   (a) providing a first insulated pipe section and a second insulated pipe section, wherein each of the insulated pipe sections comprises:
   (i) a steel pipe having an outer surface and an end, wherein an annular connection surface is located at said end of the steel pipe,
   (ii) a corrosion protection coating provided over the outer surface of the steel pipe, wherein a terminal end of the corrosion protection coating is spaced from the end of the pipe; and
   (iii) a pipe insulation layer provided over the corrosion protection coating, wherein a terminal end of the pipe insulation layer is spaced from the end of the pipe, and wherein the pipe insulation layer comprises a polymer composition having thermal conductivity of less than about 0.40 W/mk, and/or heat resistance to continuous operating temperatures from about 150° C. to above about 205° C.;
   wherein the corrosion protection coating and the pipe insulation layer together comprise a line pipe coating of the insulated pipe sections; and
   wherein each of the insulated pipe sections has a bare end portion in which the outer surface of the steel pipe is exposed, the bare end portion extending from the end of the steel pipe to the terminal end of either the corrosion protection coating or the pipe insulation layer;
   (b) welding the steel pipe of the first insulated pipe section to the steel pipe of the second insulated pipe section, so as to form a circumferential weld joint between the annular connection surfaces of the steel pipes, and so as to form a continuous joint area which includes the circumferential weld joint and the bare end portions of the insulated pipe sections;
   (c) applying a first field joint insulation layer over the joint area, wherein the first field joint insulation layer comprises a polymer composition having heat resistance to continuous operating temperatures from about 150° C. to above about 205° C.

2. The method of claim 1, wherein the first field joint insulation layer comprises a silicone elastomer having heat resistance to continuous operating temperatures from about 150° C. to above about 205° C., and wherein the silicone elastomer comprises a room temperature vulcanizing (RTV) silicone elastomer selected from the group comprising single component and dual component silicone elastomers.

3. The method of claim 2, wherein the first field joint insulation layer is applied directly to the bare end portions of the insulated pipe sections in said joint area, and wherein the first field joint insulation layer is applied to a thickness which is substantially equal to a thickness of the line pipe coating.

4. The method of claim 3, further comprising the step of applying a protective layer over the first field joint insulation layer, wherein the protective layer comprises an unfoamed polymeric material and overlaps the line pipe coating on both sides of the first field joint insulation layer.

5. The method of claim 1, further comprising the step of applying an anti-corrosion coating to the joint area after the steel pipes are welded together, wherein the anti-corrosion coating comprises a silicone elastomer having heat resistance to continuous operating temperatures from about 150° C. to above about 205° C., and wherein the first field joint insulation layer comprises a room temperature vulcanizing (RTV) silicone elastomer selected from the group comprising single component and dual component silicone elastomers.

6. The method of claim 5, wherein the silicone elastomer of the anti-corrosion coating is a dual component RTV silicone elastomer;

wherein the method further comprises applying heat to the anti-corrosion coating to cure the silicone elastomer.

7. The method of claim 5, wherein a lip of the corrosion protection layer protrudes beyond the terminal end of the pipe insulation layer of each of the insulated pipe sections, and wherein the anti-corrosion coating at least partially overlaps said lip.

8. The method of claim 7, further comprising the step of applying a barrier layer over the terminal ends of the pipe insulation layers, wherein the barrier layer comprises a RTV silicone elastomer which is applied to the terminal ends of the pipe insulation layer before the anti-corrosion coating is applied.

9. The method of claim 8, wherein the barrier layer is at least partially cured by application of heat before the anti-corrosion coating is applied to the joint area.

10. The method of claim 5, wherein the first field joint insulation layer comprises a crosslinked, thermoset fluoroelastomer composition.

11. The method of claim 10, wherein the fluoroelastomer composition is applied to the joint area in at least a partially uncured form, and wherein the fluoroelastomer composition is cured by heating the pipe before and/or during application of the first field joint insulation layer, or wherein the fluoroelastomer composition is left in the uncured form.

12. The method of claim 5, wherein the first field joint insulation layer comprises hydrogenated nitrile butadiene rubber (HNBR), or a blend of HNBR and a crosslinked, thermoset fluoroelastomer composition.

13. The method of claim 1, further comprising the step of applying a second field joint insulation layer over the first field joint insulation layer, wherein the second field joint insulation layer comprises a polymer composition having thermoplastic having heat resistance at continuous operating temperatures in a range from about 90° C. to above about 140° C.

14. The method of claim 13, wherein the second field joint insulation layer comprises an epoxy-modified polymer network.

15. The method of claim 14, wherein the epoxy-modified polymer network comprises a network epoxy modified urethane having heat resistance at continuous operating temperatures in a range from about 90° C. to about 100° C.

16. The method of claim 13, wherein the first and second field joint insulation layers have a combined thickness which is greater than that of the line pipe coating, and wherein the second field joint insulation layer overlaps the line pipe coating on both sides of the joint area.

17. The method of claim 1, wherein the pipe insulation layer comprises a layer of a fluoroelastomer composition.

18. The method of claim 17, wherein the pipe insulation layer further comprises a layer of an elastomeric composition different from the fluoroelastomer composition.

19. The method of claim 1, wherein a lip of the corrosion protection layer protrudes beyond the terminal end of the pipe insulation layer of each of the insulated pipe sections;
wherein the first field joint insulation layer is applied directly to the bare end portions of the insulated pipe sections in said joint area; and
wherein the first field joint insulation layer at least partially overlaps said lip.

20. The method of claim 19, wherein the lip includes an outer layer comprising thermal insulation of the same composition as an innermost layer of the pipe insulation layer.

21. The method of claim 19, wherein the first field joint insulation layer and the outer layer of the lip are each comprised of a fluoroelastomer.

22. The method of claim 1, further comprising the step of applying an adhesive layer or performing a surface activating pretreatment to one or more layers of the field joint, so as to improve adhesion between said layers, wherein the surface activating pretreatment is selected from flame treatment, corona discharge treatment, and plasma treatment.

23. An insulated conduit, comprising:
(a) a first insulated pipe section and a second insulated pipe section, wherein each of the insulated pipe sections comprises:
(i) a steel pipe having an outer surface and an end, wherein an annular connection surface is located at said end of the steel pipe,
(ii) a corrosion protection coating provided over the outer surface of the steel pipe, wherein a terminal end of the corrosion protection coating is spaced from the end of the pipe;
(iii) a pipe insulation layer provided over the corrosion protection coating, wherein a terminal end of the pipe insulation layer is spaced from the end of the pipe, and wherein the pipe insulation layer comprises a polymer composition having thermal conductivity of less than about 0.40 W/mk, and/or heat resistance to continuous operating temperatures from about 150° C. to above about 205° C., wherein the corrosion protection coating and the pipe insulation layer together comprise a line pipe coating of the insulated pipe sections; and
(iv) a circumferential weld joint between the annular connection surfaces of the steel pipes, wherein a continuous joint area includes the circumferential weld joint and the bare end portions of the insulated pipe sections;
(b) a field joint comprising:
(i) a first field joint insulation layer over the joint area, wherein the first field joint insulation layer comprises a polymer composition having heat resistance to continuous operating temperatures from about 150° C. to above about 205° C.

24. The insulated conduit of claim 23, wherein the first field joint insulation layer comprises a silicone elastomer having heat resistance to continuous operating temperatures from about 150° C. to above about 205° C., and wherein the silicone elastomer comprises a room temperature vulcanizing (RTV) silicone elastomer selected from the group comprising single component and dual component silicone elastomers.

25. The insulated conduit of claim 24, wherein the first field joint insulation layer is applied directly to the bare end portions of the insulated pipe sections in said joint area, and wherein the first field joint insulation layer is applied to a thickness which is substantially equal to a thickness of the line pipe coating.

26. The insulated conduit of claim 25, further comprising a protective layer over the first field joint insulation layer, wherein the protective layer comprises an unfoamed polymeric material and overlaps the line pipe coating on both sides of the first field joint insulation layer.

27. The insulated conduit of claim 23, further comprising an anti-corrosion coating over the joint area, wherein the anti-corrosion coating comprises a silicone elastomer having heat resistance to continuous operating temperatures from about 150° C. to above about 205° C., and wherein the first field joint insulation layer comprises a room temperature vulcanizing (RTV) silicone elastomer selected from the group comprising single component and dual component silicone elastomers.

28. The insulated conduit of claim 27, wherein the silicone elastomer of the anti-corrosion coating is a cured, dual component RTV silicone elastomer.

29. The method of claim 27, wherein a lip of the corrosion protection layer protrudes beyond the terminal end of the pipe insulation layer of each of the insulated pipe sections, and wherein the anti-corrosion coating at least partially overlaps said lip.

30. The insulated conduit of claim 29, further comprising a barrier layer provided between the terminal ends of the pipe insulation layers and the anti-corrosion coating, wherein the barrier layer comprises a RTV silicone elastomer, wherein the barrier layer is at least partially cured.

31. The insulated conduit of claim 27, wherein the first field joint insulation layer comprises a fluoroelastomer composition.

32. The insulated conduit of claim 27, wherein the first field joint insulation layer comprises hydrogenated nitrile butadiene rubber (HNBR), or a blend of HNBR and a crosslinked, thermoset fluoroelastomer composition.

33. The insulated conduit of claim 23, further comprising a second field joint insulation layer over the first field joint insulation layer, wherein the second field joint insulation layer comprises a polymer composition having thermoplastic having heat resistance at continuous operating temperatures in a range from about 90° C. to above about 140° C.

34. The insulated conduit of claim 33, wherein the second field joint insulation layer comprises an epoxy-modified polymer network.

35. The insulated conduit of claim 34, wherein the epoxy-modified polymer network comprises a network epoxy modified urethane having heat resistance at continuous operating temperatures in a range from about 90° C. to about 100° C.

36. The insulated conduit of claim 33, wherein the first and second field joint insulation layers have a combined thickness which is greater than that of the line pipe coating, and wherein the second field joint insulation layer overlaps the line pipe coating on both sides of the joint area.

37. The insulated conduit of claim 23, wherein the pipe insulation layer comprises a layer of a fluoroelastomer composition.

38. The insulated conduit of claim 37, wherein the pipe insulation layer further comprises a layer of an elastomeric composition different from the fluoroelastomer composition.

39. The insulated conduit of claim 23, wherein a lip of the corrosion protection layer protrudes beyond the terminal end of the pipe insulation layer of each of the insulated pipe sections;
wherein the first field joint insulation layer is provided directly on the bare end portions of the insulated pipe sections in said joint area; and
wherein the first field joint insulation layer at least partially overlaps said lip.

40. The insulated conduit of claim 39, wherein the lip includes an outer layer comprising thermal insulation of the same composition as an innermost layer of the pipe insulation layer.

41. The insulated conduit of claim 40, wherein the first field joint insulation layer and the outer layer of the lip are each comprised of a fluoroelastomer.

42. The insulated conduit of claim 23, further comprising one or more adhesive layers, each of which is applied between adjacent layers of the field joint, so as to improve adhesion between said layers.

43. The insulated conduit of claim 23, one or more layers of the field joint having been subjected to a surface activating pretreatment selected from flame treatment, corona discharge treatment, and plasma treatment.

* * * * *

UNITED STATES PATENT AND TRADEMARK OFFICE
CERTIFICATE OF CORRECTION

PATENT NO.       : 9,810,366 B2  
APPLICATION NO.  : 14/455213  
DATED            : November 7, 2017  
INVENTOR(S)      : Hegdal et al.

Page 1 of 1

It is certified that error appears in the above-identified patent and that said Letters Patent is hereby corrected as shown below:

In the Specification

In Column 9, Line 63, delete "(--CF2—CF2--)" and sub therefore -- (--Ch--CF2--) --

Signed and Sealed this  
Fifteenth Day of May, 2018

Andrei Iancu  
*Director of the United States Patent and Trademark Office*